US009968507B2

(12) United States Patent
Rabin et al.

(10) Patent No.: US 9,968,507 B2
(45) Date of Patent: May 15, 2018

(54) MOTORIZED WALKER

(71) Applicant: New York Institute of Technology, Old Westbury, NY (US)

(72) Inventors: Ely Rabin, New York, NY (US); Ziqian Dong, North Bergen, NJ (US)

(73) Assignee: New York Institute of Technology, Old Westbury, NY (US)

( * ) Notice: Subject to any disclaimer, the term of this patent is extended or adjusted under 35 U.S.C. 154(b) by 61 days.

(21) Appl. No.: 15/036,985

(22) PCT Filed: Nov. 12, 2014

(86) PCT No.: PCT/US2014/065192
§ 371 (c)(1),
(2) Date: May 16, 2016

(87) PCT Pub. No.: WO2015/073521
PCT Pub. Date: May 21, 2015

(65) Prior Publication Data
US 2016/0287465 A1    Oct. 6, 2016

Related U.S. Application Data

(60) Provisional application No. 61/905,429, filed on Nov. 18, 2013.

(51) Int. Cl.
*B62B 5/04*      (2006.01)
*A61H 3/04*      (2006.01)
(Continued)

(52) U.S. Cl.
CPC .............. *A61H 3/04* (2013.01); *B60L 3/0015* (2013.01); *B60L 15/2009* (2013.01); *B60L 15/2036* (2013.01); *B60L 15/30* (2013.01); *B62D 51/04* (2013.01); *A61H 2003/002* (2013.01); *A61H 2003/007* (2013.01); *A61H 2003/043* (2013.01); *A61H 2003/046* (2013.01); *A61H 2201/0176* (2013.01); *A61H 2201/50* (2013.01); *A61H 2201/501* (2013.01);
(Continued)

(58) Field of Classification Search
CPC ................ A61H 3/04; A61H 2201/501; A61H 2201/50; A61H 2003/043; B62D 51/04; B60L 3/0015; B60L 2200/24; G01S 17/93; G01S 15/93
See application file for complete search history.

(56) References Cited

U.S. PATENT DOCUMENTS 5,168,947 A * 12/1992 Rodenborn ............ A61G 5/045
180/19.1
6,809,490 B2 * 10/2004 Jones .................... G05D 1/0219
318/568.12
(Continued)

FOREIGN PATENT DOCUMENTS

CN        202775320      *  3/2013
WO    WO2011136566 A2 * 11/2011

Primary Examiner — Michael J Zanelli
(74) Attorney, Agent, or Firm — Abelman, Frayne & Schwab

(57) ABSTRACT

A motorized walker is provided that can enable users to walk without being slowed by the walker and without needing to exert themselves to push the walker forward. The motorized walker provides additional haptic speed cues to inform the user's posture and locomotion control to prevent falling.

13 Claims, 7 Drawing Sheets

(51) Int. Cl.
*B60L 3/00* (2006.01)
*B60L 15/20* (2006.01)
*B60L 15/30* (2006.01)
*B62D 51/04* (2006.01)
*G01S 15/93* (2006.01)
*G01S 17/93* (2006.01)
*A61H 3/00* (2006.01)

(52) U.S. Cl.
CPC ........... *A61H 2201/5028* (2013.01); *A61H 2201/5064* (2013.01); *A61H 2201/5097* (2013.01); *B60L 2200/24* (2013.01); *B60L 2240/12* (2013.01); *B60L 2240/423* (2013.01); *G01S 15/93* (2013.01); *G01S 17/93* (2013.01); *Y02T 10/7258* (2013.01)

(56) References Cited

U.S. PATENT DOCUMENTS

| | | | | |
|---|---|---|---|---|
| 6,983,813 | B1* | 1/2006 | Wright | A47D 1/10 |
| | | | | 180/11 |
| 7,204,328 | B2* | 4/2007 | LoPresti | G01S 17/936 |
| | | | | 180/19.3 |
| 2012/0046821 | A1* | 2/2012 | Pettersson | A61G 5/04 |
| | | | | 701/25 |
| 2012/0318311 | A1* | 12/2012 | Alghazi | A61H 3/04 |
| | | | | 135/66 |
| 2013/0103226 | A1* | 4/2013 | Fu | A61H 3/04 |
| | | | | 701/1 |

* cited by examiner

User-set distance-finding sensor boundaries and zones related to automatic object avoidance module 290

User-set distance-finding sensor boundaries and zones related to automatic tracking module 270

User-set distance-finding sensor boundaries and zones related to automatic object avoidance module 290 and automatic tracking module 270

MOTORIZED WALKER

RELATED APPLICATION

This application is based on and claims priority to U.S. Provisional Patent Application No. 61/905,429, filed on 18 Nov. 2013, the disclosure of which is incorporated herein in its entirety by reference.

BACKGROUND OF THE INVENTION

Field of the Invention

This invention relates to a portable, user-controlled motorized walker that delivers haptic walking-speed cues specific to the environment by virtue of its motion, to aid the gait of those at risk for falling in the clinic and in the real world.

Description of Related Art

Aging, injury and disease can lead to patients experiencing a loss of stability and being at a greater risk for falls. Fall-related injuries contribute to reduced activity, reduced quality of life, depression, social isolation and mortality in vulnerable populations. Fall incidents are the third leading cause of chronic disablement in older persons and account for more than 80% of the hospitalizations for injuries in older adults. In 2007, approximately 250,000 hip fractures from falling occurred in the U.S. This figure is expected to double in the next 30 years with the growth of the group at greatest risk, those older than 65.

Of persons aged 65 years and older, 30% have fallen at least once, and 15% have fallen at least twice. Ten percent of falls lead to bone fractures and other serious injuries. Among the residents of long-term care facilities, 45-70% fall each year, with 50% experiencing multiple falls. Injuries caused by falling include hip fractures, other leg injuries, and internal organ damage including traumatic brain injuries. About one quarter of the people who experience a fall consult a hospital emergency room or primary care physician after the incident. Approximately 20-30% of those who fall suffer injuries that increase dependence, and 25% of hip fracture patients die within a year of injury.

Based on 1997 data, the total health care cost of falls among community-dwelling adults was approximately $7.8 billion (adjusted for inflation to 2002). In 2004, the average hospitalization cost for a fall injury was $17,500. A study of military veterans showed the average annual individual hip fracture Medicare payment was $69,389 in 2007. The total direct cost of fall injuries for people 65 and older in 2000 reached $19 billion. The 2005 annual cost of treating fractures from falling was $12 billion. Another estimate yielded an annual direct cost of $20.8 billion from falls among the elderly, the sick, and among people in the workplace. The Center for Disease Control and Prevention adjusts this to $54.9 billion annually by 2020 including direct and indirect costs, inflation and population projections.

While a cane can provide a user with greater stability, more than 1.5 million people in the United States use standard or wheeled walkers, which provide even greater stability and assistance than a cane.

Aging and Parkinson's disease are two causes that lead to patients using walkers, with changes in somatosensory and musculoskeletal systems resulting in a drop in the sensory information that guides normal postural control, leading to falls. Parkinson's disease is the most commonly reported diagnosis in people over 65, and is the most common neurological disorder associated with gait disturbance and falling. Freezing of gait, the most disruptive effect of Parkinson's disease on gait, can lead to falls, loss of mobility and independence. During freezing of gait, individuals move forward with very small steps or experience leg trembling in place despite efforts to walk regularly. Of falls suffered by individuals with Parkinson's disease, 70-80% are related to individual factors such as poor postural control or freezing, as opposed to environmental factors. However, freezing of gait tends to occur under specific contexts such as transiting narrow passages, turning or crossing the street.

Recent studies find that 50-68% of people with Parkinson's disease experience falls. Half of this group are likely to fall again—a likelihood nine times that of healthy individuals. Parkinson's disease also multiplies the risk of hip fracture by nine. The cost of caring for an individual with Parkinson's disease is doubled by a broken bone and tripled by a broken hip. For individuals with Parkinson's disease, 45% have a fear of falling and 44% restrict activity, which can lead to weakness which can lead to more falling and greater costs to all. Falling and resulting dependence is also associated with negative changes in quality of life, depression, reduction of activity and social isolation. Falling also creates more stress for caregivers, which can lead to institutionalization.

Interventions intended to improve posture and gait may involve visual or auditory sensory cues, provided via either a mechanism or personal coaching. However, most such interventions do not carry over from the clinic to everyday living, and performance returns to pre-intervention levels. Haptic cuing (from touch) devices overcomes the shortcomings of retention of interventions, particularly in the realm of gait initiation and freezing of gait in individuals with Parkinson's disease, because they engage postural reflexes to stabilize posture and require no learning.

Postural instability associated with Parkinson's disease is not helped by dopaminergic therapy. Therefore, a great need exists for providing patients with Parkinson's disease with support to prevent falls, which will reduce health care costs, increase life expectancy, and provide improved mobility, independence and quality of life. As noted above, walkers can provide additional stability for users. However, walkers slow the user down and require additional effort to push.

It is therefore an object of the present invention to provide a comprehensive solution to provide a motorized walker that can enable users to walk without being slowed by the walker and without needing to exert themselves to push the walker forward.

Another object is to provide additional haptic speed cues to inform the user's posture and locomotion control to prevent falling. The walker may reduce the risk of falling directly by (1) increasing haptic feedback to the user and (2) avoiding immediate conditions that lead to falling by its sensor-feedback-driven automatic guidance systems, and also (3) indirectly by providing walking exercise that increases user strength and fitness.

SUMMARY OF THE INVENTION

The above objects and further advantages are provided by the apparatus and system of the invention for walker users.

According to one aspect of the present invention an apparatus and system provide for a motorized walker that requires no additional effort to be pushed and has powered, automated controls requiring minimal effort, and therefore does not slow and fatigue the user as does a traditional passive walker.

It is another object of the present invention that the motorized walker, guided by its onboard control system, provides additional haptic speed cues to inform the user's posture and locomotion control to prevent falling. The motorized walker delivers haptic speed cues by virtue of its motion, to be followed as a user follows a motorized lawnmower or snow-blower, rather than to be pushed by the user like a standard walker. The speed and direction of the walker is controlled by the user via a manual online controller and also by an independent online feedback system to avoid obstacles.

BRIEF DESCRIPTION OF THE DRAWINGS

The invention will be described in further detail below and with reference to the attached drawings in which the same or similar elements are referred to by the same or similar reference numerals, in which.

DETAILED DESCRIPTION OF THE INVENTION

The present invention broadly consists of a motorized walker that is steered by an onboard control system according to online user-controls and automatic sensor feedback, providing haptic speed cues to inform the user's posture and locomotion control.

Reference will now be made in detail to implementations of the invention, examples of which are illustrated in the accompanying drawings.

Figure 1A:
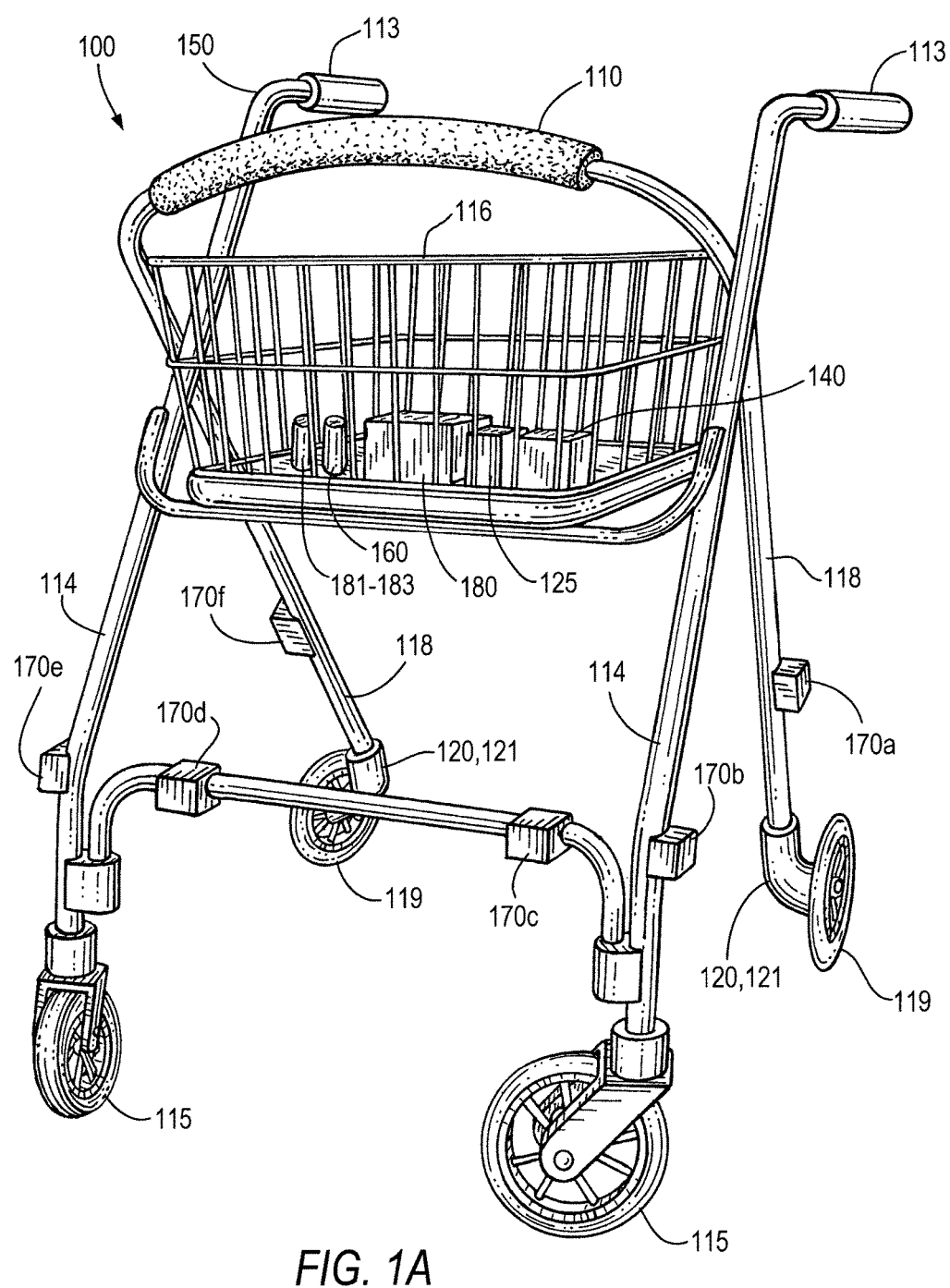
FIG. 1A is a diagram of a first embodiment of the motorized walker, illustrating the component parts.

FIG. 1A illustrates an embodiment of a motorized walker 100, in which the frame 110 is a standard rolling walker that includes front legs 114, front wheels 115, rear legs 118, rear wheels 119, handgrips 113, and basket 116. Frame 110 features a height aspect ratio that provides an adequate base of support for the user's posture, and is fabricated from materials that are strong enough to support the user's weight, if necessary.

Frame 110 is supplemented with variable speed reversible electric motors 120 that drive the rear wheels 119, motor controller 125, a power unit 140, a manual online controller 150, power button 160, sensors 170a-170f for automatic hazard detection, and a microcontroller 180 that implements control schemes and that allows for the blending of commands from the human controls with sensor-driven automation.

When electric motors 120 are not energized, the motor shafts are locked, thus serving as brakes. In a preferred embodiment, electric motors 120 are mounted on the front aspect of rear legs 118. In one embodiment, AME 218-series 12-volt 212 in-lb RH long-shaft gearmotors were selected as suitable for electric motors 120. These motors, manufactured by AM Equipment, are intended by the manufacturer for use as windshield-wiper motors. In one embodiment, clutch mechanism 121 allows the user to disengage electric motors 120, allowing the walker to be pushed in the same manner as a normal non-motorized walker. In one embodiment, clutch mechanism 121 is a mechanical clutch activated by a lever on the handgrip 113 connected to a clutch cable. In another embodiment, clutch mechanism 121 includes a switch mounted next to the handgrip 113, the switch controlling battery-powered solenoids that decouple the electric motors 120 from rear wheels 119.

Power unit 140 is a rechargeable battery, which in a preferred embodiment is rated for 12 volts. Power unit 140 is preferably mounted in basket 116.

Manual online controller 150 allows for the online control of speed and direction of powered movement. Manual online controller 150 is, in a preferred embodiment, a mini-joystick, such as manufactured by Phidgets, Inc., the deflection direction of which transduces the user's intended direction, and the deflection extent of which transduces the user's intended speed of the walker. Depressing the top of the joystick along its axis sends a signal to interrupt automatic guidance control. In another embodiment, manual online controller 150 is a force sensor. In yet another embodiment, manual online controller is a track pad.

Figure 1B:
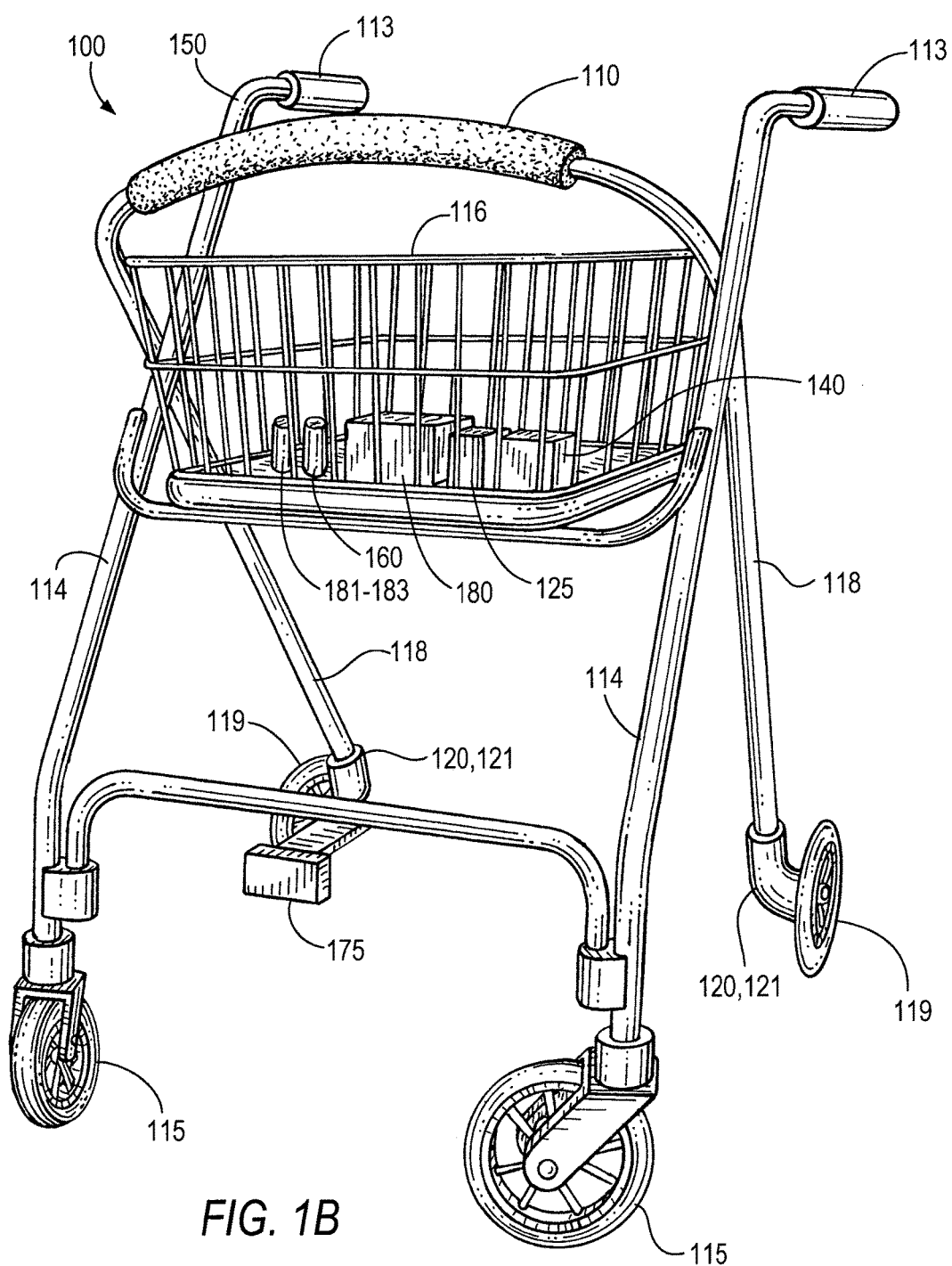
FIG. 1B is a diagram of a second embodiment of the motorized walker, illustrating the component parts.

FIG. 1B is a second embodiment in which the individual sensors 170a-170f for automatic hazard detection are replaced by a single sensor 175.

Figure 2:
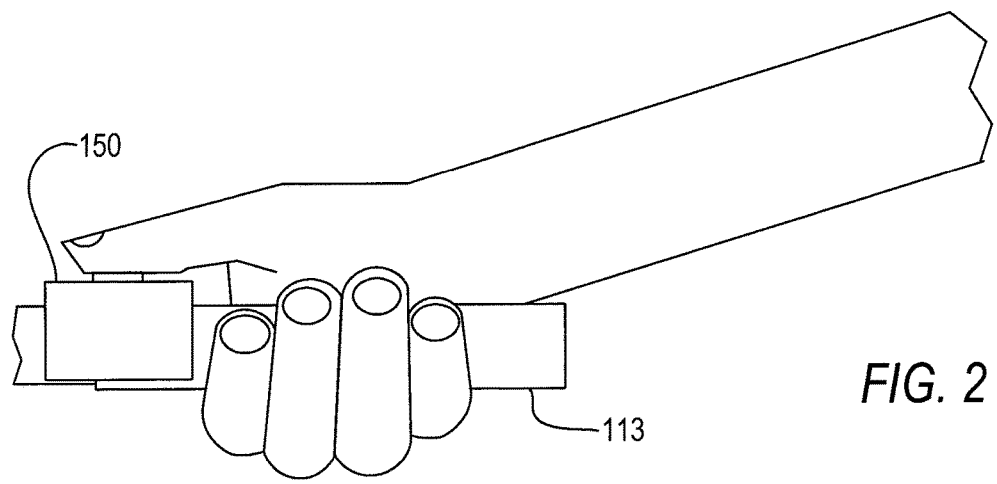
FIG. 2 illustrates a preferred arrangement of a manual online controller.

FIG. 2 shows a preferred installation of manual online controller 150 adjacent to one of the handgrips 113, where it is controlled by the user's thumb while he maintains a grip on that handgrip 113.

Power button 160 in a preferred embodiment is a switch, such as a pushbutton or toggle switch, and is preferably rated 12 volt, 10 amp. It serves as a switch for power unit 140, allowing the energization or de-energization of motorized walker 100. In a preferred embodiment, power button 160 is located on one of handgrips 113. In another preferred embodiment, power button 160 is located within basket 116 adjacent to power unit 140. As discussed above, the function of power button 160 could be integrated into joystick 150, such as by depressing the joystick along its long axis.

In another embodiment, an emergency stop device is incorporated. In a preferred embodiment, the emergency stop device is a tether connecting the user to motorized walker 100, wherein if the user becomes separated from the walker, the tether will be pulled away from the walker, switching off power unit 140 and de-energizing the walker, bringing it to a stop. In another embodiment, the emergency stop device is incorporated into handgrips 113, so that the motorized walker is de-energized if the user releases his grip of the handles.

Figure 3A:
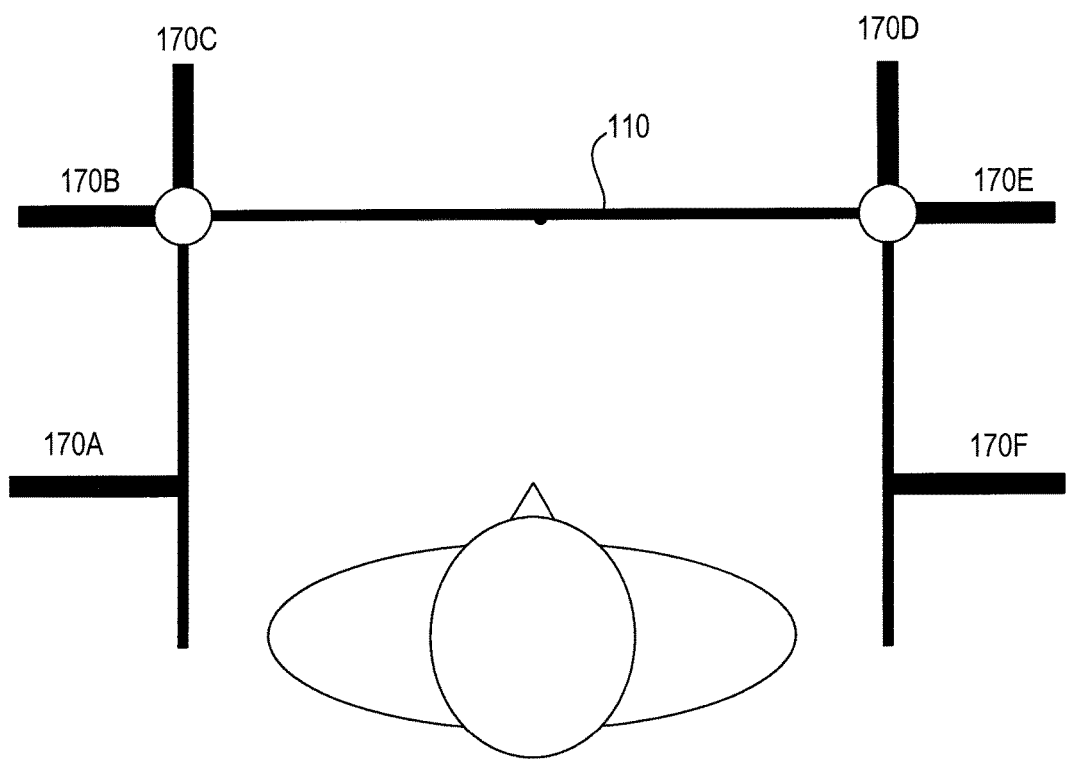
FIGS. 3A and 3B illustrate embodiments of distance-finding sensors.

FIG. 3A shows one embodiment in which the six ranging sensors 170a-170f shown in the embodiment of FIG. 1A are mounted on frame 110 to detect obstacles and walls. Each sensor provides signals to the microcontroller 180 signaling distance from any external object to the sensor. Sensors 170a and 170b are left side sensors, comprising left rear sensor 170a and left front sensor 170b, which monitor for a left wall or other obstacle to the left. Anterior left sensor 170c and anterior right sensor 170d monitor for forward objects. Sensors 170e and 170f are the right side sensors, comprising right front sensor 170e and right rear sensor 170f, which monitor for a right wall or other obstacle to the right. Infrared or ultrasonic sensors can be used for the ranging sensors, though ultrasonic sensors perform better in bright sunlight. In a preferred embodiment, sensors 170a-170f were sourced as Parallax PING)))™ Ultrasonic Distance Sensor, with an effective range of 2-300 cm.

Figure 3B:
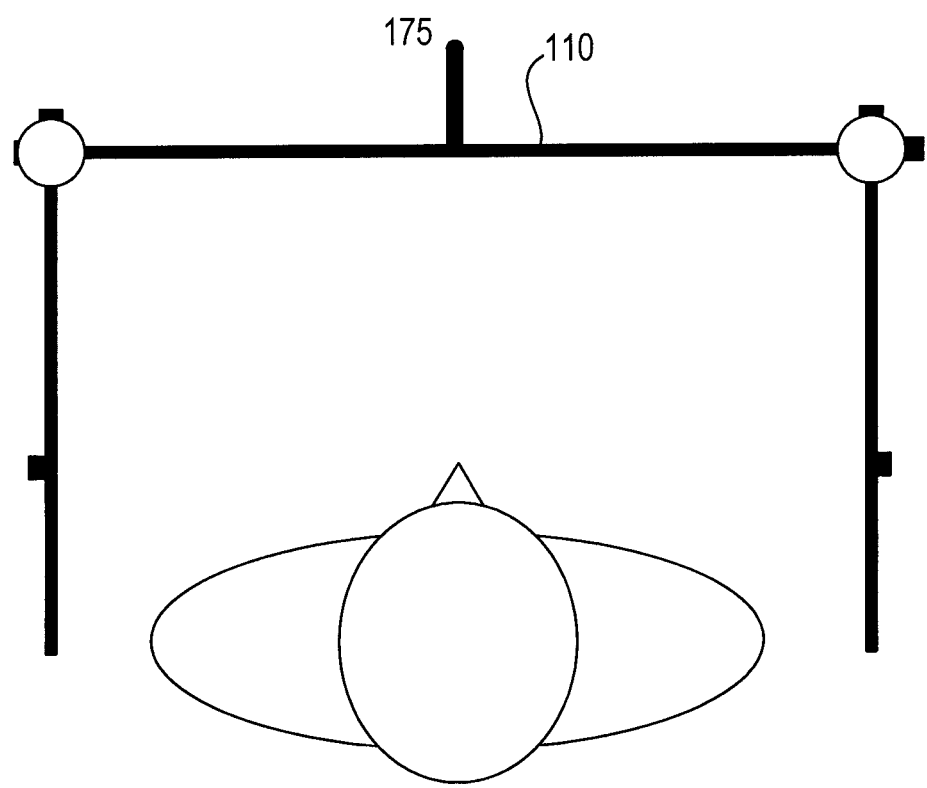

FIG. 3B shows a second embodiment in which the single sensor 175 shown in the embodiment of FIG. 1B is mounted on frame 110 to detect obstacles and walls. Single sensor 175 provides the ability to monitor the same area of coverage as that provided by the individual sensors 170a-170f in the previously discussed six-sensor embodiment. In a preferred embodiment with a single sensor 175, the sensor was sourced as a laser range-finder sensor, manufactured by Hokuyo, model: URG 04 LX-UG 01.

One of ordinary skill in the art will comprehend that other sensor configurations are possible, including different numbers and types of sensors, and different placements of sensors on the walker frame. One of ordinary skill will also realize that sensors can be selected based upon sensitivity range and appropriateness for the environment and anticipated use of the walker.

Microcontroller 180 integrates user commands from manual online controller 150 and feedback either from multiple sensors 170a-170f or from single sensor 175, and sends appropriate signals to electric motors 120 (via motor controller 125) to start, stop and steer the walker safely. Turning the walker is accomplished by differential output to each motor; i.e., one of electric motors 120 is commanded to move at a particular speed in either the forward or reverse direction, while the second of electric motors 120 is commanded to move at a different speed in the same or opposite direction, or to stop altogether. In a preferred embodiment microcontroller 180 was sourced as an Arduino Mega 2560 microcontroller, which includes a microprocessor, memory, digital inputs/outputs, analog inputs, and a USB connection. In a preferred embodiment, a control algorithm is uploaded to the memory of microcontroller 180 via the USB connection.

Microcontroller 180 also receives signals via a wireless Bluetooth modem 181 connected to the microcontroller 180 via support circuitry 182 from a remote interface 183. In a preferred embodiment, Bluetooth modem 181 was sourced as BlueSMiRF Gold. In a preferred embodiment, remote interface 183 is a cell phone running a Linux-based operating system, such as Android version 2.3, which in turn is running an application allowing the setting of various control parameters and modes, e.g., which sensors or user controls are used to control the walker. In an alternate embodiment, remote interface 183 communicates directly to microcontroller 180 via support circuitry, such as a USB port or serial communication port. In a preferred embodiment, remote interface 183 is mounted to frame 110.

In a preferred embodiment, a Sabertooth dual 10 amp motor driver is selected as motor controller 125.

Remote interface 183 allows a user to select the value for parameters related to walker control; to enable or disable inputs to the control of the walker including any of the specific sensors or manual online controls; to enable or disable aspects of control such as automatic tracking, automatic object avoidance, or reverse procession. It will be understood by one of ordinary skill in the art that the user can be assisted in making these settings by a caregiver. Among the parameters that can be set are: the maximum procession speed, being the speed at which the walker will proceed at full forward deflection setting of the manual online controller 150; the ratio of maximum procession speed to turning speed, being the fraction of the maximum procession speed divided by the turning speed of the walker; a speed transition duration, the time for which direction-dependent speed changes will occur; individual stop distances associated with each sensor 170a-170f (or each equivalent region of the multiple regions monitored by single sensor 175), defining the outer boundary of a zone around the walker within which an external object registered by any proximity sensor 170a-170f may trigger the stop module; a front search distance, defining the outer boundary of a zone in front of the walker within which an object registered by a front proximity sensor may trigger the left or right turn modules to avoid collision; left and a right tracking search distances, defining the outer boundaries within which a wall or other surface registered by sensors 170a-170f engages tracking module 270; and left and right tracking target distances, being the distance from a left side or right side proximity sensor to an adjacent wall or other surface toward which the tracking module will steer the walker to travel parallel to the surface. Other settings are the enabling or disabling of: the manual online controller 150; the individual proximity sensors 170a-170f; reverse motorized procession capability; object avoidance capability; left-side tracking capability; and right-side tracking capability. Other settings are: the priority of left- or right-side tracking when conditions to engage both are satisfied; whether tracking may be interrupted with manual online controller 150; whether object avoidance may be interrupted with manual online controller 150; whether user-interrupted tracking is reengaged after a latency; whether user-interrupted object avoidance is reengaged after a latency; the latency of re-engagement after tracking interruption; and the latency of re-engagement after object avoidance interruption. The roles of these settings in controlling the walker are discussed in further detail below.

Figure 4A:
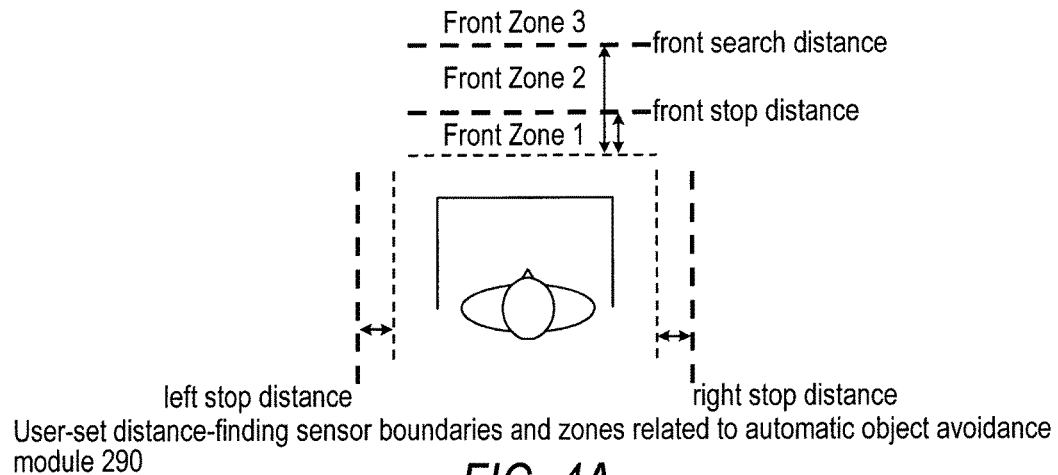
FIGS. 4A-C illustrate distance-finding sensor guidance threshold parameters set by the user, and associated zones.
Figure 4B:
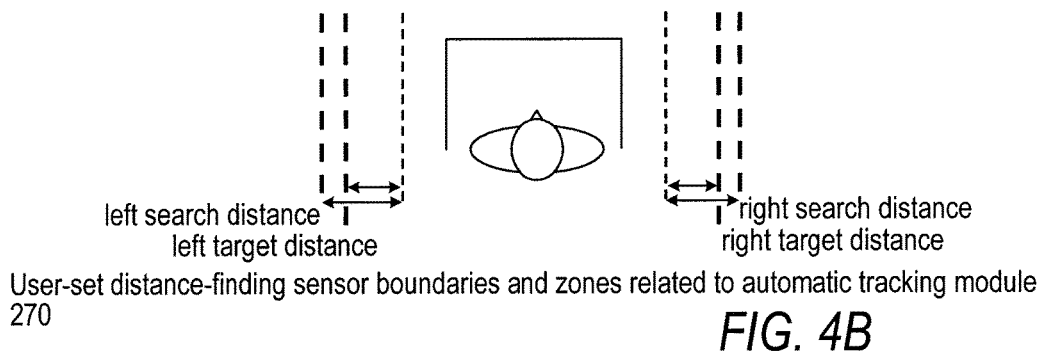
Figure 4C:
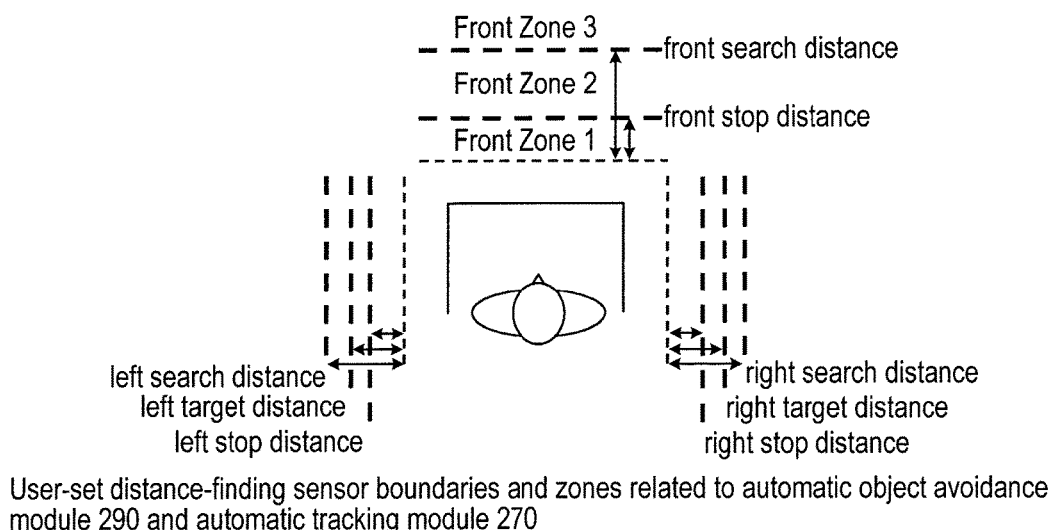

As discussed above, ranging sensors 170a-170f or single sensor 175 monitor for obstacles and walls. These elements appear within different boundaries surrounding the walker that are set by the user via the remote interface 183, in terms of distance from the walker. Boundaries associated with each sensor are set individually via the remote interface 183. Sensors can be grouped in the remote interface 183 to set common boundaries (e.g., left side sensors 170a and 170b, or the equivalent left-side regions monitored by single sensor 175). External objects sensed in these boundaries can trigger control responses mediated by object avoidance module 290 and/or tracking module 270, specific to the external object location and boundary settings. These modules will be described later in this specification. FIG. 4A illustrates the front stop distance, front search distance, left stop distance, and right stop distance, which are associated with object avoidance module 290. FIG. 4B illustrates the left search distance, right search distance, left target distance, and right target distance, which are associated with tracking module 270. FIG. 4C combines the distances identified in FIGS. 4A and 4B, and is relevant when both object avoidance module 290 and tracking module 270 are active. It is convenient to discuss the areas defined by the boundaries associated with object avoidance in terms of "zones." Thus, objects detected by sensors may be said to be within specific zones prescribed by boundaries set by the user with the remote interface 183. One of ordinary skill in the art will comprehend that a different number or configuration of the zones is possible.

Figure 5:
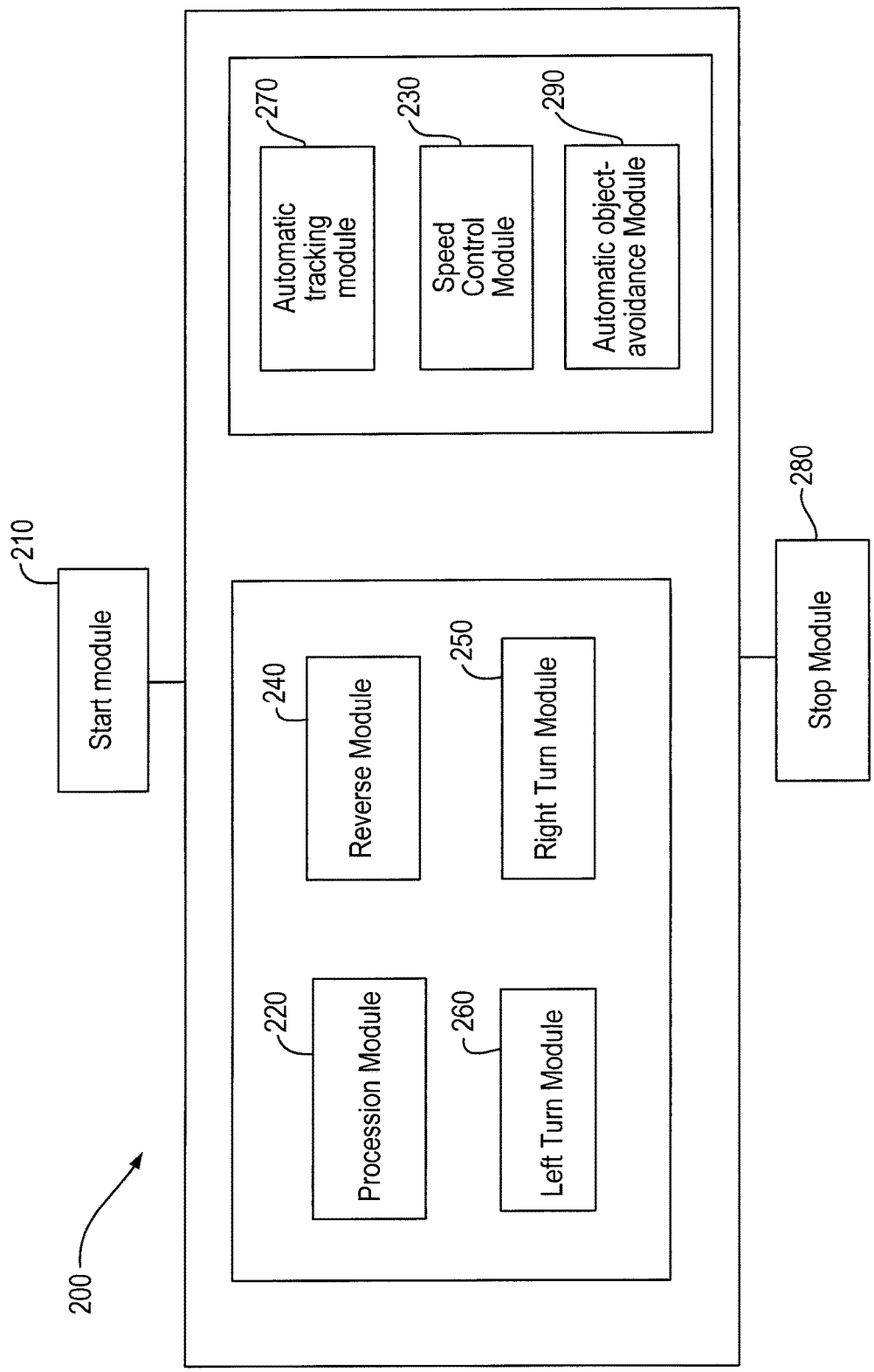
FIG. 5 illustrates a schematic block diagram of modules for implementing control of the motorized walker.

FIG. 5 illustrates a schematic block diagram of modules in accordance with an embodiment of the present invention, system 200. In the system, the modules are stored in the memory of microcontroller 180 and are executed in the processor of microcontroller 180.

A tracking module 270 can guide the walker to automatically travel parallel to any continuous external surface to one side of the walker such as a wall. When enabled, the tracking module 270 is engaged to guide parallel to a continuous surface on the left side at a left target distance from that surface when left side sensors 170a, 170b or left side regions monitored by single sensor 175 register a single continuous surface closer to them than a left search distance. Also, when enabled, the tracking module 270 is engaged to guide parallel to a continuous surface on the right side at a right target distance from that surface when right side sensors 170e, 170f or right side regions monitored by single sensor 175 register a single continuous surface closer to them than a right search distance. FIG. 4B illustrates the relative orientations of left and right search and target distances with respect to the walker in a preferred embodiment. Enablement of the tracking module 270, left and right search distances, and the left and right target distances are set by the user via remote interface 183. The user can selectively enable the tracking module function for each side of the walker via remote interface 183.

If the left rear sensor 170a and left front sensor 170b (or equivalent regions monitored by single sensor 175) both detect an object within the left search distance, the object is considered to be a wall or other surface to the left of the walker. In the tracking mode, the system will steer the walker toward the left target distance from the detected wall or surface. The target distance is maintained by the control system by steering the walker away from the detected wall or surface if the left front sensor 170b or single sensor 175 is closer to the detected wall or surface than the target distance and by steering the walker toward the detected wall or surface if the left front sensor 170b or single sensor 175 is further from the detected wall or surface than the target distance.

If the right front sensor 170e and the right rear sensor 170f (or equivalent regions monitored by single sensor 175) both detect an object within the right search distance, the object is considered to be a wall or other surface to the right of the walker. In the tracking mode, the system will steer the walker toward the right target distance from the detected wall or surface. The target distance is maintained by the control system by steering the walker away from the detected wall or surface if the right front sensor 170e or single sensor 175 is closer to the detected wall or surface than the target distance and by steering the walker toward the detected wall or surface if the front right front sensor 170e or single sensor 175 is further from the detected wall or surface than the target distance.

If two parallel walls are detected, as in a hallway, the walker will guide the walker at the target distance along either the right or left wall, as set by the user with the remote interface 183.

Rapid changes in sensor feedback from the pair of side sensors adjacent to the wall will signal a discontinuity in the wall, such as a corner, and will disengage tracking module 270. When engaged, tracking module 270 can be disengaged by the user with manual online controller 150, either by steering away from the tracked wall or surface, or by setting an interrupt button. In a preferred embodiment, the interrupt button is set by depressing the top of the joystick along its axis. In an alternate embodiment, a separate switch is used as the interrupt button. Upon user interruption, tracking module 270 is disengaged, although sensors may register a surface within the search range. In one embodiment, tracking module 270 is engaged to track on the same side again only when a new surface on that side is registered; that is, when the sensors on that side are clear of a surface within the search distance, and then register a surface within the search distance. In another embodiment, the tracking module 270 reengages automatically after a latency. Whether tracking module 270 can reengage after a latency, and the value of such a latency, can be set using remote interface 183.

An object avoidance module 290 can guide the walker to automatically turn to avoid collision with external objects or surfaces, or stop the walker when external objects are too close to navigate. When enabled, the object avoidance module 290 is engaged to turn the walker away from whichever anterior sensor 170c, 170d (or equivalent regions monitored by single sensor 175) registers an object closer to the walker than a front search distance, but further than a stop distance. FIG. 4A illustrates the relative orientations of front search and stop distances with respect to the walker in a preferred embodiment. Enablement of the object avoidance module 290, front search and stop distances are set by the user via remote interface 183.

Using the remote interface 183, the user can set a stop distance from the anterior sensors 170c, 170d (or equivalent regions monitored by single sensor 175), within which distance the detection of external objects will trigger the guidance system to stop the walker to avoid collision with the object. If any sensor detects an object closer than the stop distance associated with it, the object is considered to be within zone 1. The user can also set a front search distance from the anterior sensors 170c, 170d (or equivalent regions monitored by single sensor 175). If an anterior sensor 170c, 170d (or equivalent regions monitored by single sensor 175) detects an object between the stop distance and the front search distance, the object is considered to be within zone 2, and its detection will trigger the guidance system to steer to avoid collision with the object. If an anterior sensor 170c, 170d (or equivalent regions monitored by single sensor 175) detects an object beyond the front search distance, or detects no object at all, a zone 3 condition is established. Sensor readings corresponding to objects in zone 1, which are very close and an imminent collision may be a concern, can engage the stop module. Sensor readings corresponding to objects in zone 2 are farther away, such that a turn may be sufficient to avoid collision, and when the object avoidance module 290 is enabled via remote interface 183, a turn may be initiated automatically or by the user. Sensor readings corresponding to zone 3 designates a situation in which a sensor does not detect any object, or else detects objects that are at a great enough distance not to require immediate action to avoid a collision.

When engaged, object avoidance module 290 can be disengaged by the user with manual online controller 150, either by steering in the opposite direction to avoid the object if it is registered be sensors 170c, 170d (or equivalent regions monitored by single sensor 175) to be further than the stop distance (i.e., in zone 2), or by setting an interrupt button. In a preferred embodiment, the interrupt button is set by depressing the top of the joystick along its axis. In an alternate embodiment, a separate switch is used as the interrupt button. Upon a user interruption, object avoidance module 290 is disengaged, although sensors may register an object between the front search distance and stop distance (i.e., in zone 2). In one embodiment, object avoidance module 290 is reengaged only when a new forward obstacle is registered; that is, when the anterior sensors 170c, 170d (or equivalent regions monitored by single sensor 175) are clear of obstacles in zone 2, and subsequently register an obstacle in zone 2. In an alternate embodiment, object avoidance module 290 reengages automatically after a latency. Whether object avoidance module 290 can reengage after a latency, and the value of such a latency, can be set using remote interface 183.

The speed control module 230 determines the speed of the walker motion from: signals from user online controls 150 when enabled, scaled according to maximum speed and the ratio of maximum procession speed to turning speed set via the remote interface 183; or according to the tracking speed and the ratio of procession speed to turning speed set via the remote interface 183 when the tracking module 270 or object avoidance module 290 is engaged.

A start module 210 initializes the control system of motorized walker 100 upon user activation of power button 160.

Procession module 220 controls the forward movement of the motorized walker 100 in accordance with signals from speed control module 230, in accordance with forward steering signals from manual online controller 150 when enabled, if object avoidance module 290 is enabled but either interrupted or not engaged (i.e., in the absence of "zone 1" signals from any sensor 170a-170f or single sensor 175), and if tracking module 270 is enabled but either interrupted or not engaged, as detailed more fully in Tables 1-4.

The stop module 280 directs a stop of the motorized walker 100 in accordance signals from manual online controller 150 when the manual online controller 150 is enabled (i.e. when the joystick in a preferred embodiment is released), or in accordance with "zone 1" feedback from sensors 170a-170f or single sensor 175 when object avoidance module 290 is enabled and engaged.

The reverse module 240 directs motorized walker 100 to move in reverse in accordance with signals to steer the walker in reverse from manual online controller 150. The reverse module is enabled or disabled via remote interface 183.

The right turn module 250 directs a turn of the motorized walker 100 to the right in accordance with signals to steer the walker to the right from manual online controller 150 when enabled, in accordance with "zone 2" anterior sensor 170c, 170d signals (or equivalent signals from regions monitored by single sensor 175) when object avoidance module 290 is engaged, and in accordance with either left front sensor 170b (or equivalent region monitored by single sensor 175) signaling less than the left target distance or right front sensor 170e (or equivalent region monitored by single sensor 175) signaling greater than the right target distance when tracking module 270 when engaged.

The left turn module 260 directs a turn of the motorized walker 100 to the left in accordance with signals to steer the walker to the left from manual online controller 150 when enabled, in accordance with "zone 2" anterior sensor 170c, 170d signals (or equivalent signals from regions monitored by single sensor 175) when object avoidance module 290 when engaged, and in accordance with either left front sensor 170b (or equivalent region monitored by single sensor 175) signaling greater than the left target distance or right front sensor 170e (or equivalent region monitored by single sensor 175) signaling less than the right target distance when tracking module 270 when engaged.

The walker control comprises several control modules that enable walker control by the user as well as automatically. It is possible to enable or disable any aspect of walker control. The remote interface 183 allows users to enable or disable individual sensors 170a-170f (or equivalent regions monitored by single sensor 175), the manual online controller 150, the tracking module 270, the object avoidance module 290, and the reverse procession module. A subset of effective operating modes that result from the selective enabling of certain modules are described in detail below.

Table 1 provides an overview of the control scheme in which all sensors 170a-170f (or equivalent regions monitored by single sensor 175), tracking module 270, and object avoidance module 290 are enabled, but manual online controller 150 is disabled. With these settings, the walker's operations are governed solely by the sensors 170a-170f (or equivalent regions monitored by single sensor 175). The control system avoids detected obstacles by steering away from the side of the walker closest to the obstacle, as indicated by the distance computed from feedback of the sensors. The speed control module 230 determines the speed of the walker motion according to the tracking speed and the ratio of procession speed to turning speed set via the remote interface 183 when the tracking module 270 or object avoidance module 290 is engaged. Labels a) through j) are described more fully in corresponding subparagraphs a) through j) below the table.

TABLE 1

ALL SENSORS ENABLED, TRACKING MODULE ENABLED, OBJECT AVOIDANCE MODULE ENABLED, MANUAL ONLINE CONTROLLER DISABLED

| Anterior sensor readings | | Side sensor readings | | |
| --- | --- | --- | --- | --- |
| Left 170c | Right 170d | No Walls | Left Wall | Right Wall |
| Zone 1 | Zone 1 | | a) stop | |
| Zone 1 | Zone 2 | | | |
| Zone 1 | Zone 3 | | | |
| Zone 2 | Zone 1 | | | |
| Zone 3 | Zone 1 | | | |
| Zone 2 (object closer to left) | Zone 2 | b) steer right to avoid obstacle | i) steer right to avoid obstacle; when obstacle is cleared, resume tracking of left wall if it is still detected | j) steer left to avoid obstacle; when obstacle is cleared, resume tracking of right wall if it is still detected |
| Zone 2 | Zone 2 (object closer to right) | c) steer left to avoid obstacle | | |
| Zone 2 | Zone 3 | d) steer right to avoid obstacle | | |
| Zone 3 | Zone 2 | e) steer left to avoid obstacle | | |

TABLE 1-continued

ALL SENSORS ENABLED, TRACKING MODULE ENABLED, OBJECT AVOIDANCE MODULE ENABLED, MANUAL ONLINE CONTROLLER DISABLED

| Anterior sensor readings | | Side sensor readings | | |
|---|---|---|---|---|
| Left 170c | Right 170d | No Walls | Left Wall | Right Wall |
| Zone 3 | Zone 3 | f) proceed straight | g) tracking of left wall | h) tracking of right wall | a) If either of the anterior sensors 170c, 170d (or equivalent regions monitored by single sensor 175) detect an object in zone 1, the walker will stop.
b) If both of the anterior sensors 170c, 170d (or equivalent regions monitored by single sensor 175) detect an object in zone 2, with no adjacent walls detected by the side sensor pairs 170a/170b, 170e/170f (or equivalent regions monitored by single sensor 175), and the object is closer to the anterior left sensor 170c (or equivalent region monitored by single sensor 175) than to the anterior right sensor 170d (or equivalent region monitored by single sensor 175), the walker will steer to the right in an attempt to move around the object.
c) If both of the anterior sensors 170c, 170d (or equivalent regions monitored by single sensor 175) detect an object in zone 2, with no adjacent walls detected by the side sensor pairs 170a/170b, 170e/170f (or equivalent regions monitored by single sensor 175), and the object is closer to the anterior right sensor 170d (or equivalent region monitored by single sensor 175) than to the anterior left sensor 170c (or equivalent region monitored by single sensor 175), the walker will steer to the left in an attempt to move around the object.
d) If the anterior left sensor 170c (or equivalent region monitored by single sensor 175) detects an object in zone 2, whereas the anterior right sensor 170d (or equivalent region monitored by single sensor 175) detects an object in zone 3 or does not detect any object, and no walls are detected by the side sensor pairs 170a/170b, 170e/170f (or equivalent regions monitored by single sensor 175), then the walker will steer to the right to avoid the detected object.
e) If the anterior right sensor 170d (or equivalent region monitored by single sensor 175) detects an object in zone 2, whereas the anterior left sensor 170c (or equivalent region monitored by single sensor 175) detects an object in zone 3 or does not detect any object, and no walls are detected by the side sensor pairs 170a/170b, 170e/170f (or equivalent regions monitored by single sensor 175), the walker will steer to the left to avoid the detected object.
f) If both of the anterior sensors 170c, 170d (or equivalent regions monitored by single sensor 175) are in a zone 3 condition, with no walls detected by the side sensor pairs 170a/170b, 170e/170f (or equivalent regions monitored by single sensor 175), the walker will continue moving straight ahead.
g) If both of the anterior sensors 170c, 170d (or equivalent regions monitored by single sensor 175) are in a zone 3 condition, and a left wall is detected by the left side sensor pair 170a/170b (or equivalent regions monitored by single sensor 175), the walker will enter the tracking routine and track the left wall.
h) If both of the anterior sensors 170c, 170d (or equivalent regions monitored by single sensor 175) are in a zone 3 condition, and a right wall is detected by the right side sensor pair 170e/170f (or equivalent regions monitored by single sensor 175), the walker will enter the tracking routine and track the right wall.
i) If the left side sensor pair 170a/170b (or equivalent regions monitored by single sensor 175) detect a left wall, and the anterior sensors 170c, 170d (or equivalent regions monitored by single sensor 175) each detect an object in zone 2, the walker will turn right to avoid the detected object, thus overriding the tracking routine. When the object is avoided, the anterior sensors 170c, 170d (or equivalent regions monitored by single sensor 175) will be in a zone 3 condition, and if the left wall is still within the range of the search distance, the walker will enter the tracking routine, as in subparagraph (g) above.
j) If the right side sensor pair 170e/170f (or equivalent regions monitored by single sensor 175) detect a right wall, and the anterior sensors 170c, 170d (or equivalent regions monitored by single sensor 175) each detect an object in zone 2, the walker will turn left to avoid the detected object, thus overriding the tracking routine. When the object is avoided, the anterior sensors 170c, 170d (or equivalent regions monitored by single sensor 175) will be in a zone 3 condition, and if the right wall is still within the range of the search distance, the walker will enter the tracking routine, as in subparagraph (h) above.

Table 2 provides an overview of the control scheme in which all sensors 170a-170f (or equivalent regions monitored by single sensor 175) are enabled, and tracking module 270, object avoidance module 290 and manual online controller 150 are also enabled. The walker's operations are governed by the sensors 170a-170f (or single sensor 175) and by manual online controller 150. Speed control module 230 determines the speed in accordance with manual online controller 150, scaled according to maximum speed and the ratio of maximum procession speed to turning speed set via the remote interface 183, or according to the tracking speed and the ratio of procession speed to turning speed set via the remote interface 183 when tracking module 270 or object avoidance module 290 is engaged. The control system avoids detected obstacles by steering away from the side of the walker closest to the obstacle, as indicated by the distance computed from feedback of the sensors. Labels a) through j) are described more fully in corresponding subparagraphs a) through j) below the table. The term "MOC" is an abbreviation for manual online control; a preferred embodiment is a joystick, but any embodiment for manual online controller 150 can be employed.

TABLE 2

ALL SENSORS ENABLED, MANUAL ONLINE CONTROLLER ENABLED, TRACKING MODULE ENABLED, OBJECT AVOIDANCE MODULE ENABLED

| Anterior sensors | | Side sensor readings | | | | | | | |
|---|---|---|---|---|---|---|---|---|---|
| | | No Walls User control steering | | | Left Wall User control steering | | | Right Wall User control steering | | |
| Left 170c | Right 170d | Left | Straight | Right | Left | Straight | Right | Left | Straight | Right |
| Zone 1 | Zone 1 | | | | | a) stop | | | | |
| Zone 1 | Zone 2 | | | | | | | | | |
| Zone 1 | Zone 3 | | | | | | | | | |
| Zone 2 | Zone 1 | | | | | | | | | |

TABLE 2-continued

ALL SENSORS ENABLED, MANUAL ONLINE CONTROLLER ENABLED,
TRACKING MODULE ENABLED, OBJECT AVOIDANCE MODULE ENABLED

| Anterior sensors | | Side sensor readings | | | | | | | |
|---|---|---|---|---|---|---|---|---|---|
| | | No Walls User control steering | | | Left Wall User control steering | | | Right Wall User control steering | | |
| Left 170c | Right 170d | Left | Straight | Right | Left | Straight | Right | Left | Straight | Right |
| Zone 2 (object closer to left) | Zone 2 | b) MOC | c) steer right to avoid obstacle | b) MOC | j) stop | i) steer right to avoid obstacle; when obstacle is cleared, resume tracking of left wall if it is still detected | h) MOC | h) MOC | i) steer left to avoid obstacle; when obstacle is cleared, resume tracking of right wall if it is still detected | j) stop |
| Zone 2 | Zone 2 (object closer to right) | | c) steer left to avoid obstacle | | | | | | | |
| Zone 2 | Zone 3 | | c) steer right to avoid obstacle | | | | | | | |
| Zone 3 | Zone 2 | | c) steer left to avoid obstacle | | | | | | | |
| Zone 3 | Zone 3 | | d) MOC | | g) stop | f) tracking of left wall | e) MOC | e) MOC | f) tracking of left wall | g) stop | a) If either of the anterior sensors 170c, 170d (or equivalent regions monitored by single sensor 175) detect an object in zone 1, the walker will stop.
b) If either of the anterior sensors 170c, 170d (or equivalent regions monitored by single sensor 175) detect an object in zone 2, with the other anterior sensor detecting an object in zone 2 or being in a zone 3 condition, and no adjacent walls are detected by the side sensor pairs 170a/170b, 170e/170f (or equivalent regions monitored by single sensor 175), then the walker will allow the user to have manual control if he sets the manual online controller 150 either to the right or the left (i.e., manually avoiding the object).
c) If either of the anterior sensors 170c, 170d (or equivalent regions monitored by single sensor 175) detect an object in zone 2, with the other anterior sensor detecting an object in zone 2 or being in a zone 3 condition, and no adjacent walls are detected by the side sensor pairs 170a/170b, 170e/170f (or equivalent regions monitored by single sensor 175), and the user sets the manual online controller 150 forward (i.e., toward the object), the walker will automatically steer to avoid the object. If the object is closer to the anterior left sensor 170c (or equivalent region monitored by single sensor 175), the walker will automatically steer to the right. If the object is closer to the anterior right sensor 170d (or equivalent region monitored by single sensor 175), the walker will automatically steer to the left.
d) If both of the anterior sensors 170c, 170d (or equivalent regions monitored by single sensor 175) are in a zone 3 condition, with no walls detected by the side sensor pairs 170a/170b, 170e/170f (or equivalent regions monitored by single sensor 175), the user controls the walker via manual online controller 150.
e) For a zone 3 condition in which a wall is detected by a side sensor pair 170a/170b or 170e/170f (or equivalent regions monitored by single sensor 175), the walker will allow the user to have manual control if he sets the manual online controller 150 to steer away from the wall.
f) For a zone 3 condition in which a wall is detected by a side sensor pair 170a/170b or 170e/170f (or equivalent regions monitored by single sensor 175), if the user sets the manual online controller 150 forward, the walker will enter the tracking routine.
g) For a zone 3 condition in which a wall is detected by a side sensor pair 170a/170b or 170e/170f (or equivalent regions monitored by single sensor 175), if the user sets the manual online controller 150 to steer toward the wall, the walker will stop.
h) If a side sensor pair 170a/170b or 170e/170f (or equivalent regions monitored by single sensor 175) detect a wall, and the anterior sensors 170c, 170d (or equivalent regions monitored by single sensor 175) detect an object in zone 2 that is closer to one anterior sensor than the other, the walker will allow the user to have manual control if he sets the manual online controller 150 to steer away from the wall.
i) If a side sensor pair 170a/170b or 170e/170f (or equivalent regions monitored by single sensor 175) detect a wall, and the anterior sensors 170c, 170d (or equivalent regions monitored by single sensor 175) detect an object in zone 2 that is closer to one anterior sensor than the other, and the user sets the manual online controller 150 forward, the walker will steer away from the wall to avoid the detected object, thus overriding the tracking routine. When the object is avoided, the anterior sensors 170c, 170d (or equivalent regions monitored by single sensor 175) will be in a zone 3 condition, and if the wall is still within the range of the search distance, the walker will enter the tracking routine, as in subparagraph (f) above.
j) If a side sensor pair 170a/170b or 170e/170f (or equivalent regions monitored by single sensor 175) detect a wall, and the anterior sensors 170c, 170d (or equivalent regions monitored by single sensor 175) detect an object in zone 2 that is closer to one anterior sensor than the other, and the user sets the manual online controller 150 toward the wall, the walker will stop.

Table 3 provides an overview of a control scheme which all sensors, manual online controller 150 and object avoidance module 290 are enabled, but not tracking module 270. The walker's operations are governed by the sensors 170a-170f (or single sensor 175) and by manual online controller 150. The enabling of just these modules allows the user to have manual control, though it will stop the walker if the user advances forward toward a target that comes within zone 1 of the anterior sensors, or steers toward a side when the side sensors detect a wall or surface on that side. The speed control module 230 determines the speed of the walker motion in accordance with signals from manual online controller 150 scaled according to maximum speed and the ratio of maximum procession speed to turning speed set via the remote interface 183, or according to the tracking speed and the ratio of procession speed to turning speed set via the remote interface 183 when the object avoidance module 290 is engaged. Labels a) through j) are described more fully in corresponding subparagraphs a) through d) below the table. The term "MOC" is an abbreviation for manual online controller; a preferred embodiment is a joystick, but any embodiment for manual online controller 150 can be employed.

TABLE 3

ALL SENSORS ENABLED, MANUAL ONLINE CONTROLLER ENABLED, TRACKING MODULE DISABLED, OBJECT AVOIDANCE MODULE DISABLED

| Anterior sensors | | Side sensor readings | | | | | | | | |
|---|---|---|---|---|---|---|---|---|---|---|
| | | No Walls User control steering | | | Left Wall User control steering | | | Right Wall User control steering | | |
| Left 170c | Right 170d | Left | Straight | Right | Left | Straight | Right | Left | Straight | Right |
| Zone 1 | Zone 1 | | | | | a) stop | | | | |
| Zone 1 | Zone 2 | | | | | | | | | |
| Zone 1 | Zone 3 | | | | | | | | | |
| Zone 2 | Zone 1 | | | | | | | | | |
| Zone 2 (object closer to left) | Zone 2 | | b) MOC | | d) stop | c) MOC | c) MOC | c) MOC | c) MOC | d) stop |
| Zone 2 | Zone 2 (object closer to right) | | | | | | | | | |
| Zone 2 | Zone 3 | | | | | | | | | |
| Zone 3 | Zone 2 | | | | | | | | | |
| Zone 3 | Zone 3 | | | | | | | | | | a) If either of the anterior sensors 170c, 170d (or equivalent regions monitored by single sensor 175) detect an object in zone 1, the walker will stop.
b) If either of the anterior sensors 170c, 170d (or equivalent regions monitored by single sensor 175) detects an object in zone 2, or if there is a zone 3 condition, and no walls are detected by side sensor pair 170a/170b or 170e/170f (or equivalent regions monitored by single sensor 175), then the user controls the walker with the manual online controller 150.
c) If either of the anterior sensors 170c, 170d (or equivalent regions monitored by single sensor 175) detects an object in zone 2, or if there is a zone 3 condition, and a wall is detected by side sensor pair 170a/170b or 170e/170f (or equivalent regions monitored by single sensor 175), the walker will allow the user to have manual control if he sets the manual online controller 150 to steer either straight ahead or away from the wall.
d) If either of the anterior sensors 170c, 170d (or equivalent regions monitored by single sensor 175) detects an object in zone 2, or if there is a zone 3 condition, and a wall is detected by side sensor pair 170a/170b or 170e/170f (or equivalent regions monitored by single sensor 175), and the user sets the manual online controller 150 toward the wall, the walker will stop.

Table 4 provides an overview of the control scheme of a fully manual mode in which the walker's operations are governed solely by manual online controller 150. With these settings the walker will allow the user to have full manual control in all cases. The speed control module 230 determines the speed of the walker motion from: signals from user online controls 150 when enabled, scaled according to maximum speed and the ratio of maximum procession speed to turning speed set via the remote interface 183. The term "MOC" is an abbreviation for manual online controller 150; a preferred embodiment is a joystick, but any embodiment for manual online controller 150 can be employed.

TABLE 4

MANUAL ONLINE CONTROLLER ENABLED, TRACKING MODULE DISABLED, OBJECT AVOIDANCE MODULE DISABLED

| Anterior sensors | | Side sensor readings | | | | | | | | | | | |
|---|---|---|---|---|---|---|---|---|---|---|---|---|---|
| | | No Walls User control steering | | | | Left Wall User control steering | | | | Right Wall User control steering | | | |
| Left 170c | Right 170d | Left | Straight | Right | Released | Left | Straight | Right | Released | Left | Straight | Right | Released |
| Zone 1 | Zone 1 | | | | | | | | MOC | | | | |
| Zone 1 | Zone 2 | | | | | | | | | | | | |
| Zone 1 | Zone 3 | | | | | | | | | | | | |
| Zone 2 | Zone 1 | | | | | | | | | | | | |
| Zone 2 (object closer to left) | Zone 2 | | | | | | | | | | | | |
| Zone 2 | Zone 2 (object closer to right) | | | | | | | | | | | | |
| Zone 2 | Zone 3 | | | | | | | | | | | | |
| Zone 3 | Zone 2 | | | | | | | | | | | | |
| Zone 3 | Zone 3 | | | | | | | | | | | | |

One of ordinary skill in the art will understand that many other control schemes are possible. For example, a user can enable tracking on the right side but not the left side, or vice-versa. Another mode of operation is envisioned in which zones are defined based upon different thresholds of sensor values. Another mode of operation is envisioned in which the walker motion is controlled by states such as walker speed or acceleration values derived from online sensor position data. Other criteria can also be used, including user online or offline settings. Therefore, the tables presented above should not be considered to limit the scope of the invention.

Figure 6:
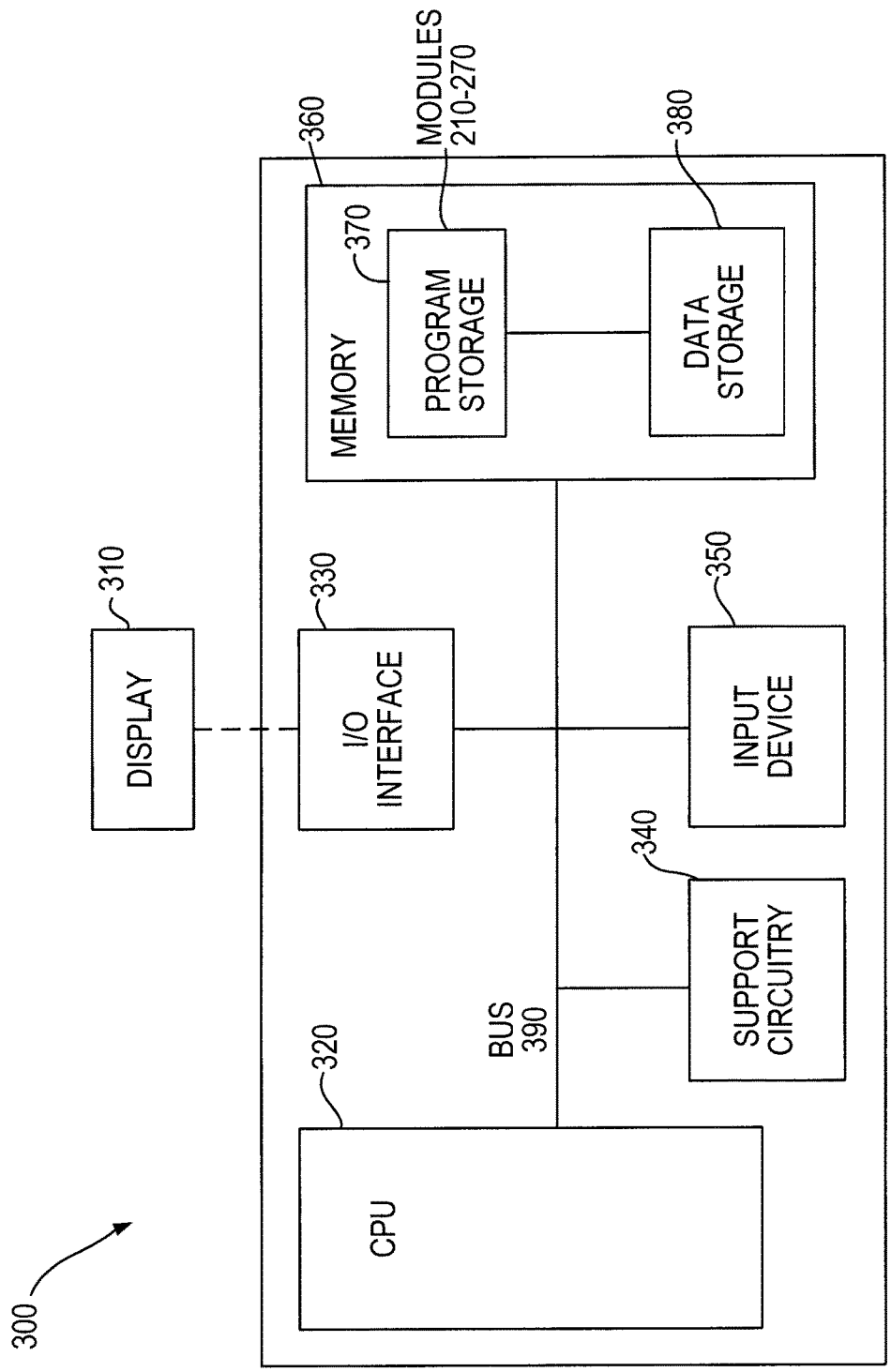
FIG. 6 illustrates an exemplary block diagram of a computer system in which the control system of the motorized walker is implemented.

FIG. 6 shows an exemplary block diagram of a computer system 300 in which the control system of the motorized walker can be implemented. Computer system 300 includes a processor 320, such as a central processing unit, an input/output interface 330 and support circuitry 340. Input devices 350 such as a manual online controller 150 are also provided. Computer system 300 can interface to a remote display 310 through input/output interface 330. The input devices 350, processor 320, and support circuitry 340 are shown connected to a bus 390 which also connects to a memory 360. Memory 360 includes program storage memory 370 and data storage memory 380. Programming of modules is accomplished over the input/output interface 330 via a detachable input device as is known with respect to interfacing programmable logic controllers.

Program storage memory 370 and data storage memory 380 can each comprise volatile (RAM) and non-volatile (ROM) memory units and can also comprise hard disk and backup storage capacity, and both program storage memory 370 and data storage memory 380 can be embodied in a single memory device or separated in plural memory devices. Program storage memory 370 stores software program modules and associated data, and in particular stores a start module 210, procession module 220, speed control module 230, reverse module 240, right turn module 250, left turn module 260, tracking module 270, stop module 280, object avoidance module 290, or a combination including at least one of the foregoing modules. The operation of these modules has been described above.

It is to be appreciated that the computer system 300 can be any portable computer such as a personal computer, minicomputer, a dedicated controller such as a programmable logic controller, or a combination thereof. While the computer system 300 is shown, for illustration purposes, as a single computer unit, the system can comprise a group of computers which can be scaled depending on the processing load and database size.

Computer system 300 preferably supports an operating system, for example stored in program storage memory 370 and executed by the processor 320 from volatile memory.

The system and method of the present invention have been described above and with reference to the attached drawings; however, modifications will be apparent to those of ordinary skill in the art and the scope of protection for the invention is to be defined by the claims that follow.

The invention claimed is:

1. A motorized walker comprising:
    a wheeled frame; one or more electric motors; a manual online controller; at least one proximity sensor sensing a plurality of regions around the motorized walker, including sensing a wall adjacent to the motorized walker; and an automated control system;
    wherein the automated control system further comprises:
        a non-volatile memory that stores data and a plurality of executable program modules;
        a processor coupled to the non-volatile memory;
        a first executable program module being a procession module that is stored within the non-volatile memory and that when executed by the processor supplies control signals to at least one of the one or more electric motors of the motorized walker such that the motorized walker moves in a forward direction;
        a second executable program module being a reverse module that is stored within the non-volatile memory and that when executed by the processor supplies control signals to at least one of the one or more electric motors of the motorized walker such that the motorized walker moves in a reverse direction;
        a third executable program module being a right turn module that is stored within the non-volatile memory and that when executed by the processor supplies control signals to at least one of the one or more electric motors of the motorized walker such that the motorized walker turns toward the right;
        a fourth executable program module being a left turn module that is stored within the non-volatile memory and that when executed by the processor supplies control signals to at least one of the one or more electric motors of the motorized walker such that the motorized walker turns toward the left;
        a fifth executable program module being a stop module that is stored within the non-volatile memory and that when executed by the processor supplies control signals to stop the one or more electric motors of the motorized walker;
        a sixth executable program module being a speed control module that is stored within the non-volatile memory and that when executed by the processor determines the appropriate speed at which the motorized walker moves;
        a seventh executable program module being an object avoidance module that is stored within the non-volatile memory and that when executed by the processor supplies control signals to at least one of the one or more electric motors of the motorized walker such that the motorized walker slows and turns to avoid frontal collision; and
        an eighth executable program module being a tracking module that is stored within the non-volatile memory and that when executed by the processor supplies control signals to at least one of the one or more electric motors of the motorized walker such that the motorized walker travels parallel to and maintains a fixed distance from the adjacent wall.

2. The motorized walker of claim 1, further comprising an emergency stop device.

3. The motorized walker of claim 1, further comprising a clutch device to disengage the one or more electric motors and allow a user to operate the walker as one would operate a non-motorized walker.

4. The motorized walker of claim 1, further comprising a remote interface whereby a user can set the following parameters:
    a maximum procession speed, being the speed at which the walker will proceed at full forward setting of the manual online controller;
    the ratio of maximum procession speed to turning speed, being the fraction of the maximum procession speed divided by the turning speed of the walker;
    a speed transition duration, the time for which direction-dependent speed changes will occur;

individual stop distances associated with each region being sensed by the at least one proximity sensor, defining the outer boundary of a zone around the walker within which an external object registered by any region being sensed by the at least one proximity sensor triggers the stop module;

a front search distance, defining the outer boundary of a zone in front of the walker within which an object registered by the at least one proximity sensor triggers the left or right turn modules to avoid collision;

left and right tracking search ranges, defining the outer boundaries within which the adjacent wall registered by the at least one proximity sensor engages the tracking module;

left and right tracking target distances, being the distances from the at least one proximity sensor to the adjacent wall toward which the tracking module automatically steers the walker;

whether the reverse module is enabled;

whether the manual online controller is enabled;

whether the object avoidance module is enabled;

whether automatic left-side tracking is enabled;

whether automatic right-side tracking is enabled;

the procession speed when automatic object avoidance by the avoidance module is engaged or when automatic tracking by the tracking module is engaged;

the ratio of tracking procession speed to turning speed, being the fraction of the maximum procession speed divided by the turning speed of the walker during tracking;

priority of left or right-side tracking when conditions to engage both are satisfied;

whether the tracking module can be interrupted by the manual online controller;

whether automatic object avoidance can be interrupted by the manual online controller;

whether the tracking module, upon being interrupted by a user, is automatically reengaged after a latency;

whether the object avoidance module, upon being interrupted by a user, is automatically reengaged after a latency;

latency of tracking module re-engagement; and latency of object avoidance module re-engagement.

5. The motorized walker of claim 4, further comprising a clutch device to disengage the at least one of the one or more electric motors and allow a user to operate the walker as one would operate a non-motorized walker.

6. The motorized walker of claim 1, wherein the at least one proximity sensors comprise a left rear proximity sensor, a left front proximity sensor, an anterior left proximity sensor, an anterior right proximity sensor, a right front proximity sensor, and a right rear proximity sensor, each of which senses a single region around the motorized walker;

wherein the procession module supplies the control signals to at least one of the one or more electric motors of the motorized walker to move in a forward direction;

wherein the stop module supplies the control signals to stop the at least one of the one or more electric motors of the motorized walker;

wherein the reverse module supplies the control signals to the at least one of the one or more electric motors of the motorized walker to move in a reverse direction;

wherein the right turn module supplies control signals to the at least one of the one or more electric motors of the motorized walker such that the motorized walker turns toward the right;

wherein the left turn module supplies control signals to the at least one of the one or more electric motors of the motorized walker such that the motorized walker turns toward the left;

wherein a stop module supplies control signals to stop the at least one of the one or more electric motors of the motorized walker;

wherein a speed control module determines the appropriate speed at which the motorized walker moves;

wherein the object avoidance module supplies the control signals to the at least one of the one or more electric motors of the motorized walker to turn the walker away from the sensor closest to an object in front of the walker to avoid collision with that object;

wherein the tracking module monitors the right front proximity sensor, right rear proximity sensor, left front proximity sensor, and left rear proximity sensor for detection of an adjacent left or adjacent right continuous surface within a predetermined range, and upon detection of at least one adjacent continuous surface, the tracking module engages the appropriate control (procession, left or right turn) modules of the motorized walker such that it maintains a fixed distance from the adjacent wall where one wall is detected, and maintains a fixed distance from the wall with higher priority where both a left wall and right wall are detected.

7. The motorized walker of claim 6, further comprising an emergency stop device.

8. The motorized walker of claim 6, further comprising a remote interface.

9. The motorized walker of claim 6, further comprising a clutch device to disengage the at least one of the one or more electric motors and allow a user to operate the walker as one would operate a non-motorized walker.

10. The motorized walker of claim 1, wherein the at least one proximity sensors comprise a single proximity sensor sensing a plurality of regions around the motorized walker;

wherein the procession module supplies the control signals to the at least one of the one or more electric motors of the motorized walker to move in a forward direction;

wherein the stop module supplies the control signals to stop the at least one of the one or more electric motors of the motorized walker;

wherein the reverse module supplies the control signals to the at least one of the one or more electric motors of the motorized walker to move in a reverse direction;

wherein the right turn module supplies control signals to the at least one of the one or more electric motors of the motorized walker such that the motorized walker turns toward the right;

wherein the left turn module supplies control signals to the at least one of the one or more electric motors of the motorized walker such that the motorized walker turns toward the left;

wherein a stop module supplies control signals to stop the at least one of the one or more electric motors of the motorized walker;

wherein a speed control module determines the appropriate speed at which the motorized walker moves;

wherein the object avoidance module supplies the control signals to the at least one of the one or more electric motors of the motorized walker to turn the walker away from the sensor closest to an object in front of the walker to avoid collision with that object;

wherein the tracking module monitors a right front region sensed by the proximity sensor, a right rear region sensed by the proximity sensor, a left front region sensed by the proximity sensor, and a left rear region sensed by the proximity sensor for detection of an adjacent left or adjacent right continuous surface within a predetermined range, and upon detection of at least one adjacent continuous surface, the tracking module engages the appropriate control (procession, left or right turn) modules of the motorized walker such that it maintains a fixed distance from the adjacent wall where one wall is detected, and maintains a fixed distance from the wall with higher priority where both a left wall and right wall are detected.

11. The motorized walker of claim 10, further comprising an emergency stop device.

12. The motorized walker of claim 10, further comprising a remote interface.

13. The motorized walker of claim 10, further comprising a clutch device to disengage the at least one of the one or more electric motors and allow a user to operate the walker as one would operate a non-motorized walker.

\* \* \* \* \*